United States Patent [19]

Foti

[11] Patent Number: 5,913,165
[45] Date of Patent: Jun. 15, 1999

[54] METHOD FOR CHANGING SUBSCRIBER SERVICE FEATURES IN A RADIO TELECOMMUNICATIONS NETWORK

[75] Inventor: George Foti, Dollard des Ormeaux, Canada

[73] Assignee: Telefonaktiebolaget LM ericsson (publ), Stockholm, Sweden

[21] Appl. No.: 08/773,023

[22] Filed: Dec. 24, 1996

[51] Int. Cl.[6] .................................................. H04Q 7/00
[52] U.S. Cl. ............................................................ 455/435
[58] Field of Search .................................... 455/433, 435, 455/461

[56] References Cited

U.S. PATENT DOCUMENTS

| 5,353,331 | 10/1994 | Emery et al. | 455/461 |
| 5,504,804 | 4/1996 | Widmark et al. | 379/63 |
| 5,592,533 | 1/1997 | McHenry et al. | 455/435 |

FOREIGN PATENT DOCUMENTS

WO 95/21509  8/1995  WIPO .

Primary Examiner—William Cumming
Attorney, Agent, or Firm—Smith & Danamraj, P.C.

[57] ABSTRACT

A method and system for changing subscriber service features in a radio telecommunications network is disclosed. The method begins by a subscriber originating a call from a telephone located in a telecommunications network to a roamer port located within a Mobile Switching Center (MSC) which may be located inside or outside the subscriber's home coverage area. The MSC sends a dial tone to the telephone. Next, the subscriber sends a feature code and Mobile Identification Number (MIN) through the telephone to the MSC requesting a service feature change. The MSC recognizes and verifies the feature code as a valid code. The MSC also associates a service feature change corresponding to the feature code and associates the MIN with a HLR. The MSC sends a feature request invoke message to the associated HLR requesting a service feature change. Then, the HLR implements the service feature change in the HLR. If the roamer port coverage encompasses more than a single MSC, and the subscriber is located in an MSC that does not include the roamer port, the HLR updates the subscriber's categories in the MSC in which the subscriber is currently registered.

30 Claims, 6 Drawing Sheets

METHOD FOR CHANGING SUBSCRIBER SERVICE FEATURES IN A RADIO TELECOMMUNICATIONS NETWORK

BACKGROUND OF THE INVENTION

1. Technical Field of the Invention

This invention relates to radio telecommunication systems and, more particularly, to a system and method in a radio telecommunications network for accessing and changing a mobile subscriber's service features through a roamer port.

2. Description of Related Art

In existing radio telecommunication networks, a mobile subscriber may utilize his mobile telephone (i.e. mobile station) to access the network and change his subscriber service features. In some situations, the subscriber may wish to change his service features, but he does not want to utilize, or cannot utilize his mobile station. For example, his battery may be dead, he may not have his mobile station with him, or he just may not want to pay the charge for a mobile call. In such a situation, it would be desirable to be able to change his mobile subscriber service features from a standard wireline telephone or from another mobile station.

In existing radio telecommunication networks, however, there is no way for a mobile subscriber to access and change his service features from a telephone other than his own mobile station. In the situation where the subscriber's mobile station is inoperative, the mobile subscriber is then unable to make outgoing calls or receive incoming calls, and he cannot access his service features, for example to activate call forwarding to a wireline phone where he can be reached. Additionally, in the situation where the mobile subscriber roams outside his home coverage area, the mobile subscriber incurs additional charges for accessing and changing his service features outside his home coverage area.

There are several disadvantages in the existing system, given the limitations of a mobile subscriber to access and change his service features from another source other than his mobile station. First, if the battery goes dead in his mobile station, the subscriber loses the ability to communicate through the cellular network. In addition, since there is no capability to access the subscriber's service features from another instrument other than his mobile station, the subscriber loses flexibility in changing his features. Also, if the subscriber moves outside his home coverage area, the subscriber loses the ability to access and change his service features without incurring additional charges for accessing and changing his service features outside the subscriber's home coverage area.

Although there are no known prior art teachings of a solution to the aforementioned deficiency and shortcoming such as that disclosed herein, a prior art reference that discusses subject matter that bears some relation to matters discussed herein is U.S. Pat. No. 5,046,082 to Zicker. This reference is discussed briefly below.

Zicker discloses a system for allowing remote access to cellular telephone programming through the Pubic Switched Telephone Network (PSTN). The system includes a Remotely Accessible Cellular Telephone (RACT) and a host system for managing a multiplicity of such RACTs. The RACT can be configured either as a cellular telephone itself, or as a kit which combines with a conventional cellular telephone to form a RACT. The RACT includes a signal detection circuit configured to detect a unique identifying signal that the host system generates and is not commonly found in conventional data communication traffic. Zicker discloses a system which changes internal parameters in a cellular telephone remotely through the PSTN. Certain parameters are changed within the cellular phone itself, in order to enable the cellular phone to receive the remote programming. Zicker does not disclose a system or method for remotely changing the service features of a mobile subscriber without utilizing a mobile telephone to request the changes to the service features.

A method and system is needed that enables a subscriber to change his subscriber service features from a source other than the subscriber's mobile station.

It would be a distinct advantage to have a system and method for changing subscriber service features in a radio telecommunications network. It is an object of the present invention to provide such a system and method.

SUMMARY OF THE INVENTION

In one aspect, the present invention is a method of changing a mobile subscriber's service features from a telephone in a telecommunications network. The method begins by the subscriber originating a call from the telephone to a roamer port located within a MSC When the incoming call is received in the roamer port, the MSC sends a dial tone to the telephone. The subscriber, by means of the telephone, sends a feature code and Mobile Identification Number (MIN) to the MSC requesting a service feature change. Next, the MSC recognizes the feature code and verifies that the feature code is a valid feature code. The MSC then determines a service feature change corresponding to the feature code. Next, the MSC associates the MIN with a Home Location Register (HLR). Subsequently, the MSC sends a feature request invoke message having a service feature change and MIN to the HLR. The HLR then implements the service feature change.

In another aspect of the present invention, the present invention is a method of changing a mobile subscriber's service features from a telephone in a telecommunications network. The method begins by the subscriber originating a call from the telephone to a roamer port located within a MSC. When the incoming call is received in the roamer port, the MSC sends a dial tone to the telephone. The subscriber, by means of the telephone, sends a feature code and a MIN to the MSC requesting a service feature change. Next, the MSC recognizes the feature code and verifies that the feature code is a valid feature code. The MSC then determines a service feature change corresponding to the feature code. Next, the MSC associates the MIN with a HLR. Subsequently, the MSC sends a feature request invoke message to the HLR. The feature request message includes a service feature change, MIN, and an indicator that the requested change was initiated at the roamer port. The HLR then implements the service feature change. Next, the HLR determines whether the feature service change has been successfully implemented. The HLR sends a feature request return result message to the MSC indicating the result of the service feature change. The MSC then sends an aural signal to the telephone indicating whether the service feature change was successfully implemented. The HLR may also determine whether there was a roamer port indicator in the feature request message. If there was, and the subscriber's status is active and the subscriber's stored location is different from the location where the feature request message originated, then the HLR updates the subscriber's categories in the MSC where the subscriber is roaming.

In another aspect, the present invention is a system for changing a mobile subscriber's service features from a telephone in a telecommunications network. The system comprises a HLR for implementing changes to the subscriber's service features and a MSC having a roamer port for receiving an incoming call from the subscriber. The MSC also includes the means for recognizing a request for a change in the service feature. Additionally, the system also includes a means for sending the request for a change in the service feature from the telephone to the MSC and a means for sending the request for a change in the service feature from the MSC to the HLR.

BRIEF DESCRIPTION OF THE DRAWINGS

The invention will be better understood and its numerous objects and advantages will become more apparent to those skilled in the art by reference to the following drawings, in conjunction with the accompanying specification, in which.

DETAILED DESCRIPTION OF EMBODIMENTS

The present invention is a system and method in a radio telecommunications network for changing subscriber service features in a radio telecommunications network.

Figure 1:
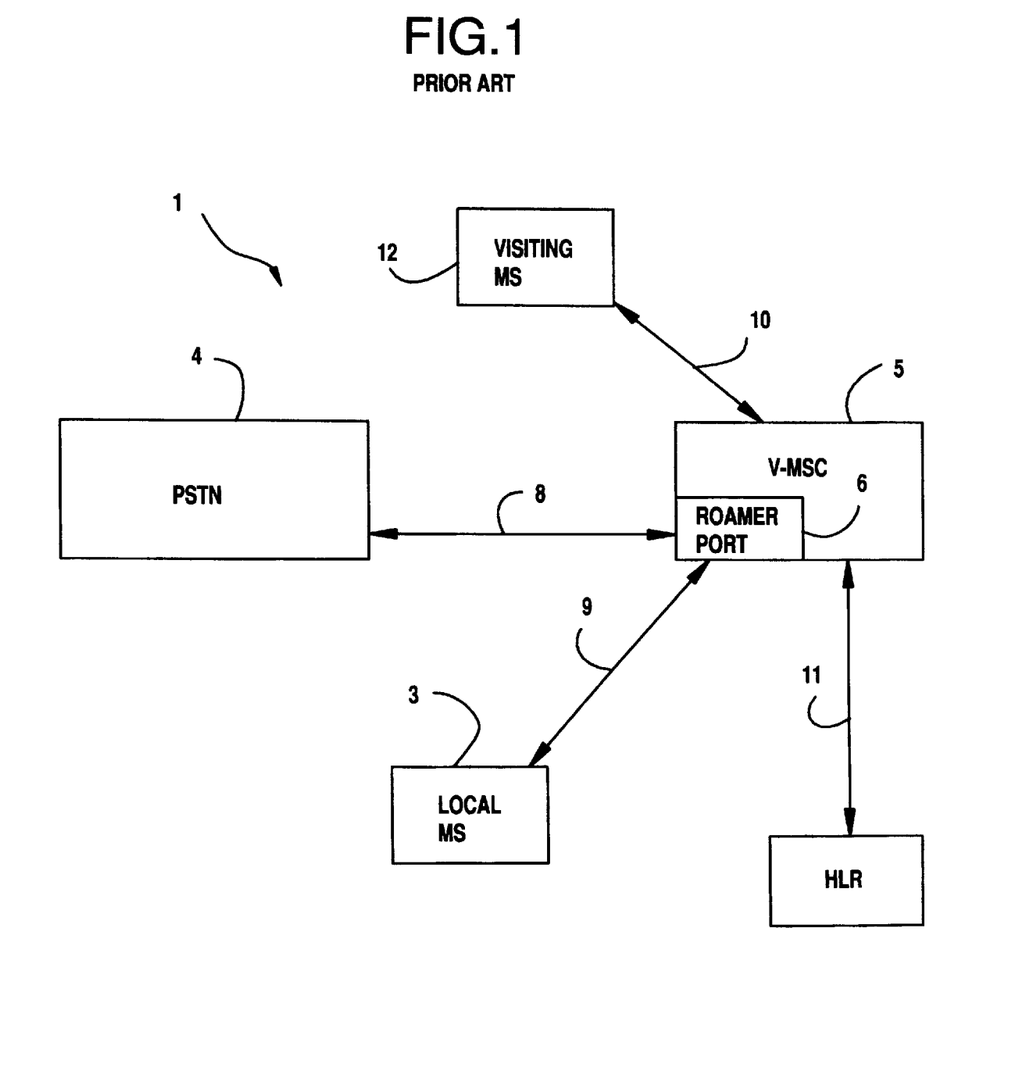
FIG. 1 (Prior Art) is a simplified block diagram illustrating the components of an existing radio telecommunications network which utilizes a roamer port for call delivery to a visiting Mobile Station (MS)

FIG. 1 (Prior Art) is a simplified block diagram illustrating the components of an existing radio telecommunications network which utilizes a roamer port 6 for call delivery to a visiting Mobile Station (MS) 12 roaming in a V-MSC 5 outside his home coverage area. The radio telecommunication network 1 includes the visiting MS 12, a Visitor Mobile Switching Center (V-MSC) 5 having the roamer port 6, a Home Location Register (HLR) 7, communications links 8–11, a local MS 3 and the Public Switched Telephone Network (PSTN) 4.

The V-MSC 5 is a switching center providing all the necessary switching functions in the existing radio telecommunication system 1, as well as a gateway to other telecommunication systems such as the PSTN. All service areas within each cellular network are required by regulations to have roamer port coverage. Roamer ports provide local calling subscribers the ability to call visiting mobile subscribers who are roaming in the coverage area of the roamer port 6, without incurring long distance charges. To utilize the roamer port 6, a calling subscriber dials a roamer port number. He then gets a second dial tone and dials the number of the visiting subscriber. The roamer port 6 only recognizes correctly dialed telephone numbers, and the only function performed by the roamer port/MSC is call delivery.

The HLR 7 is a database used for the management of the mobile subscribers using the radio telecommunication system 1. The information found in the HLR 7 includes subscriber information such as location and identity of the subscriber, as well as the subscriber's profile and service features.

The communications link 9 provides the MS 3 the ability to communicate with the roamer port 6. The communications link 8 provides wireline phones the ability to communicate with the roamer port 6 through the PSTN 4. The communications link 10 provides the visiting MS 12 the ability to communicate with V-MSC 5. The communications link 11 provides the V-MSC 5 the ability to communicate with the HLR 7.

In the existing radio telecommunication network 1, a visiting MS 12 roams outside its home coverage area into another coverage area and registers with V-MSC 5. While roaming in the new coverage area, MS 12 can receive calls from local subscribers (landline or mobile originated) through the roamer port 6. This is achieved as follows. A wireline subscriber within the coverage area of the roamer port 6 who desires to call the visiting MS 12 can call the roamer port 6, by using the PSTN 4 (landline originated call through communications link 8), or the local MS 3 (mobile originated call through communications link 9). The call to the roamer port 6 is a local telephone call for the calling subscriber. Once successfully connected to the roamer port 6, the calling subscriber receives a dial tone after which he calls the desired subscriber number (MS 12). The V-MSC 5 associated with the roamer port 6 delivers the call to the visiting MS 12 through the communications link 10.

Figure 2:
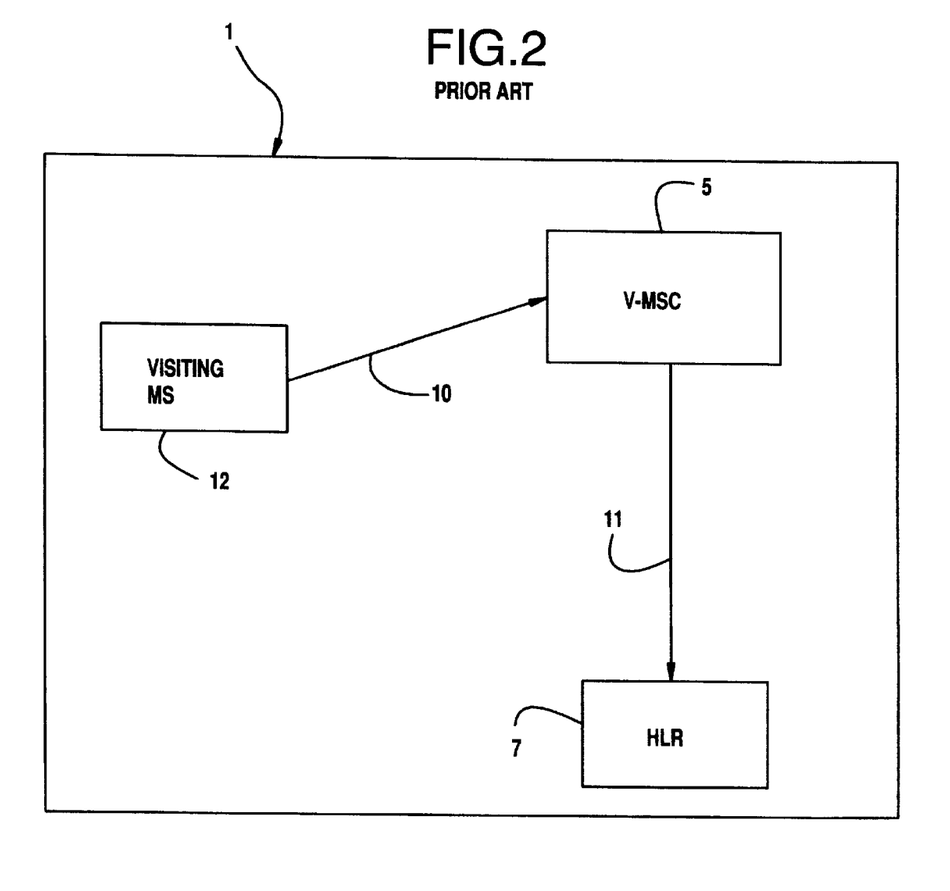
FIG. 2 (Prior Art) is a simplified block diagram illustrating the components of an existing radio telecommunication network which utilizes a Mobile Switching Center (MSC) to access and change subscriber service features.

FIG. 2 (Prior Art) is a simplified block diagram illustrating the components of an existing radio telecommunication network which utilizes V-MSC 5 to access and change subscriber service features. The radio telecommunications network 1 includes visiting MS 12, V-MSC 5, HLR 7, communications link 10, and communications link 1.

In the existing radio telecommunication network 1, a mobile subscriber can only access and change his subscriber service features by using his own mobile station (for example, the visiting MS 12). Once the MS 12 is on, and has registered with the V-MSC 5, the mobile subscriber of MS 12 can invoke a service feature request by inputting the desired feature code into the MS 12. The MS 12 sends the feature code to the V-MSC 5. The V-MSC 5 then passes the feature code and required information identifying the MS 12 to the HLR 7 in a feature request invoke message. The HLR 7 makes the necessary changes in the HLR 7 database in order to implement the desired service features and returns a feature request return result message to the V-MSC 5. The same scheme for subscriber service features can be employed whether the subscriber is inside or outside his home coverage area.

Since the visiting MS 12 must be utilized to change service features, if the visiting MS 12 becomes inoperative (for example when the battery is drained), the mobile subscriber cannot change features such as activating call forwarding to transfer his mobile telephone number to another location In addition, if the V-MSC 5 is not located within the mobile subscriber's home coverage area, additional charges may be incurred for the long distance communications required for changing the service features in the HLR 7.

Figure 3:
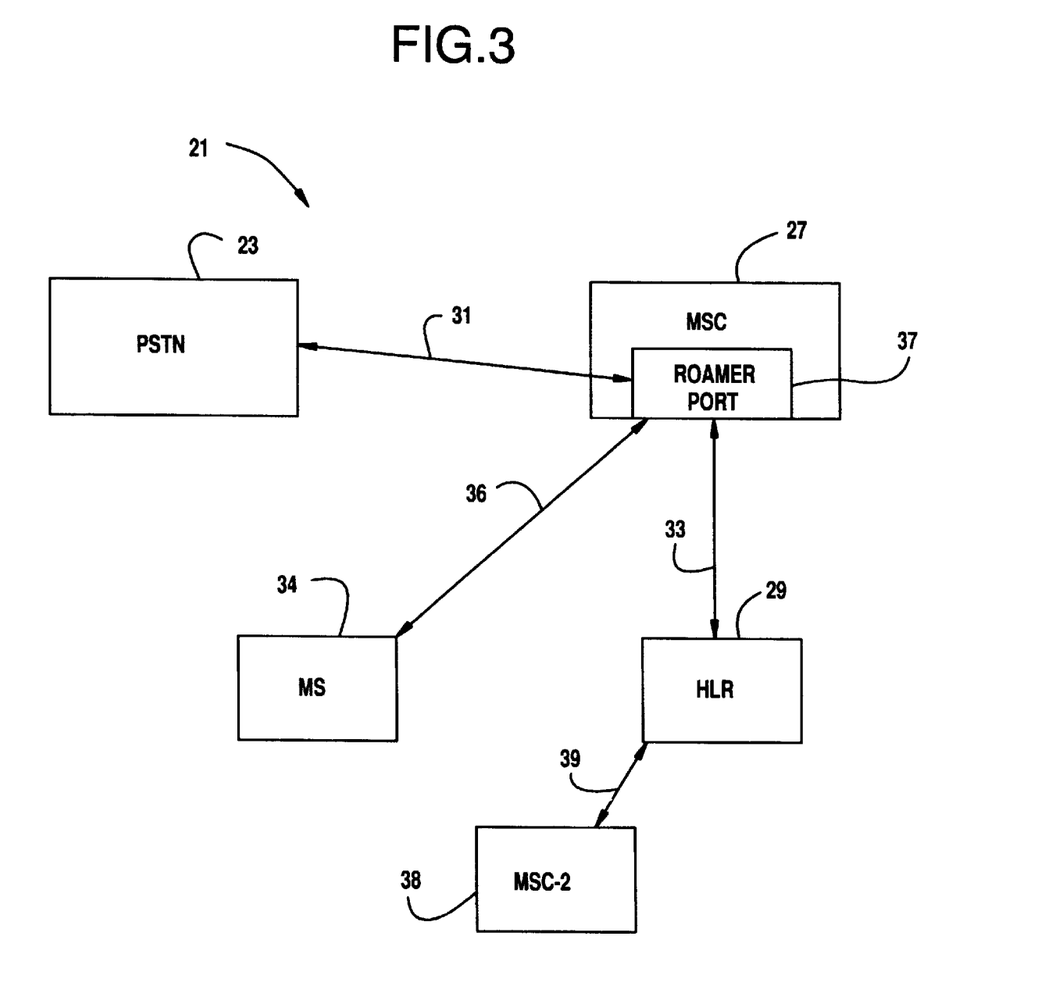
FIG. 3 is a simplified block diagram illustrating the components of a radio telecommunications system providing access to a mobile subscriber's service features through a roamer port according to the teachings of the present invention.

FIG. 3 is a simplified block diagram illustrating the components of a radio telecommunications system providing access to a mobile subscriber's service features through a roamer port according to the teachings of the present invention. Although the PSTN is illustrated as a source from which the service features may be accessed and changed, this is exemplary only. Any telephone or other source capable of calling the roamer port 37 is suitable and within the scope of the present invention.

In the preferred embodiment of the present invention, a radio telecommunication system interfaces with the PSTN 23 or the MS 34, and includes a MSC 27 having the roamer port 37, a HLR 29, a second MSC (MSC-2) 38, and communications links 31, 33, 36, and 39. The PSTN 23 is a telephone network providing telephone communication between parties through the use of landlines. The MS 34 is a mechanism the mobile subscriber uses for communicating with the radio telecommunications network 21. The mobile subscriber of MS 34 is registered within the HLR 29 with his subscriber profile and service features.

The MSC 27 is a switching center providing all the necessary switching functions, as well as a gateway to other telecommunication networks, such as the PSTN 23. The MSC 27 can be located either inside or outside the home coverage area where the subscriber is registered. The MS 34 may access the MSC 27 either through normal system access procedures or by directing a call to the roamer port 37. In the present invention, the roamer port software in the MSC 27, is modified to recognize feature codes entered by the subscriber such as, for example, #56#, in addition to recognizing correctly dialed mobile subscriber numbers. Additionally, the MSC 27 is modified to verify that the entered feature codes are valid feature codes, to associate valid feature codes with service feature changes, and to associate Mobile Identification Numbers (MINs) with HLRs. In one embodiment of the present invention, the MSC 27 utilizes a series of look-up tables to validate feature codes, to match feature codes to service feature changes, to identify an associated HLR, and to send feature request messages to the HLR 29. Included in the feature request message is an indicator that this is an roamer port initiated change. A roamer port indicator is included in the feature request message to show that the feature request message is from the roamer port. Other methods may also be utilized and still remain within the scope of the present invention.

The HLR 29 is a database used for the management of the mobile subscribers using the radio telecommunication system 21. The information found in the HLR 29 includes subscriber information such as location and identity of the subscriber, as well as the subscriber's profile and service features.

The communications link 31 provides the PSTN 23 the ability to communicate with the MSC 27. The communications link 33 provides the MSC 27 the ability to communicate with the HLR 29. The communications link 36 provides the MS 34 the ability to communicate with the MSC 27. The communications link 39 provides the HLR 29 the ability to communicate with the MSC-2 38.

Still referring to FIG. 3, a mobile subscriber located either inside or outside his home coverage area may call the MSC 27 through the PSTN 23 via communications link 31 using a landline telephone. In order to access the MSC 27 through the PSTN 23, the subscriber dials the roamer port number associated with the MSC 27. Upon receipt of the call from the PSTN 23, the MSC 27 responds by sending a dial tone to the PSTN 23 via the communications link 31 indicating the readiness of the MSC 27 to accept commands or a telephone number from the PSTN 23. The subscriber sends a service feature code indicating a command and his Mobile Identification Number (MIN) through the PSTN 23 to the MSC 27 via the communications link 31.

In order for the MSC 27 to recognize the feature code, a feature code prefix is needed at the beginning of the feature code to indicate that a feature code follows. In addition, a feature code suffix is needed at the end of the feature code to indicate that feature code has ended. In one embodiment, a "#" is used for both the prefix and the suffix. For example, a feature code may begin with a "#", followed by the service feature code, and end with a "#". The feature code suffix also separates the feature code from the MIN, which identifies the specific mobile subscriber requesting the service feature change. Additionally, in the preferred embodiment of the present invention, the MSC 27 may require the entry of a special access code such as a Personal Identification Number (PIN) to implement the requested service feature, in order to prevent unauthorized service feature requests.

After recognizing and verifying the feature code as a valid feature code, the MSC 27 associates a service feature change with the feature code and associates the MIN with the HLR 29. The MSC 27 then sends a feature request invoke message requesting the specified service feature change to the HLR 29 via the communications link 33. Included in the feature request message is an indicator that the feature request is a roamer port initiated change. If a subscriber's PIN is used as an access code, the HLR 29 validates the PIN. The HLR 29 then implements the requested feature change. If the HLR 29 successfully completes the requested service feature change, the HLR 29 sends a feature request return result message to the MSC 27 via the communications link 33. The MSC 27 may then send an aural signal, such as a tone or announcement, to the PSTN 23 via the communications link 31 indicating that the requested service feature change is complete. If the HLR 29 is unable to complete the service feature change, the HLR 29 sends a feature request return result message to the MSC 27 via the communications link 33 indicating that the service feature request was unsuccessful. The MSC 27 may then send, for example, a busy signal or negative announcement to the PSTN 23 via the communications link 31. Thus, the present invention enables a subscriber to access and change his service features through the PSTN 23.

Alternately, the mobile subscriber may call the MSC 27, where he is currently registered, through the MS 34 via communications link 36. The MS 34 may be the mobile subscriber's own phone, or it may be another mobile phone. In order to access the MSC 27 through the MS 34, the subscriber dials the roamer port number associated with the MSC 27. Upon receipt of the call from the MS 34, the MSC 27 responds by sending a dial tone to the MS 34 via the communications link 36 indicating the readiness of the MSC 27 to accept commands or a telephone number from the MS 34. The subscriber sends a service feature code indicating a command and his MIN through the MS 34 to the MSC 27 via the communications ink 36.

After recognizing and verifying the feature code as a valid feature code, the MSC 27 associates a service feature change with the feature code and associates the MIN entered by the subscriber with the HLR 29. The MSC 27 then sends a feature request invoke message, with a roamer port indicator, requesting the specified service feature change to the HLR 29 via the communications link 33. If a subscribers PIN is used as an access code, the HLR 29 validates the PIN. The HLR 29 then implements the requested feature change.

If the HLR 29 successfully completes the requested service feature change, the HLR 29 sends a feature request return result message to the MSC 27 via the communications link 33. The MSC 27 may then send an aural signal, such as a tone or announcement, to the MS 34 via the communications link 36 indicating that the requested service feature change is complete.

The HLR 29 then determines whether a roamer port indicator is present in the feature request message. If a roamer port indicator is not present, the HLR takes no further action. However, if a roamer port indicator is present, the HLR takes steps to update the categories of the mobile subscriber, if required. First, the HLR determines whether the subscriber is active. Specifically, the HLR determines whether the subscriber's mobile phone is currently operating and registered in the MSC 27 (where the service feature request message originated). If the subscriber is not active, the HLR 29 takes no further action. If, however, the subscriber is active, the HLR determines whether the subscriber's location stored in the HLR is the same or different from the location where the feature request message originated. Specifically, the HLR 29 determines whether the subscriber's stored location is in the coverage area of MSC 27, or in the coverage area of another MSC, such as MSC-2 38. If the subscriber's stored location is in the coverage area of MSC 27 (i.e., the same location where the feature request message originated), the HLR takes no further action. However, if the stored location is not in the coverage area of MSC 27 (for example, in MSC-2), the HLR 29 sends a Qualification Directive (QualDir) message to the MSC-2 through communications Link 38. The QualDir message updates the subscriber's categories in the MSC-2 38.

The above procedure is applicable in cases where the roamer port coverage encompasses more than a single MSC, and the subscriber is located in an MSC that does not include the roamer port.

If the HLR 29 is unable to complete the service feature change, the HLR 29 sends a feature request return result message to the MSC 27 via the communications link 33 indicating that the service feature request was unsuccessful. The MSC 27 may then send, for example, a busy signal or negative announcement to the MS 34 via the communications link 36. Thus, the present invention enables a subscriber to access and change his service features through the MS 34 while located either inside or outside his home coverage area.

Figure 4:
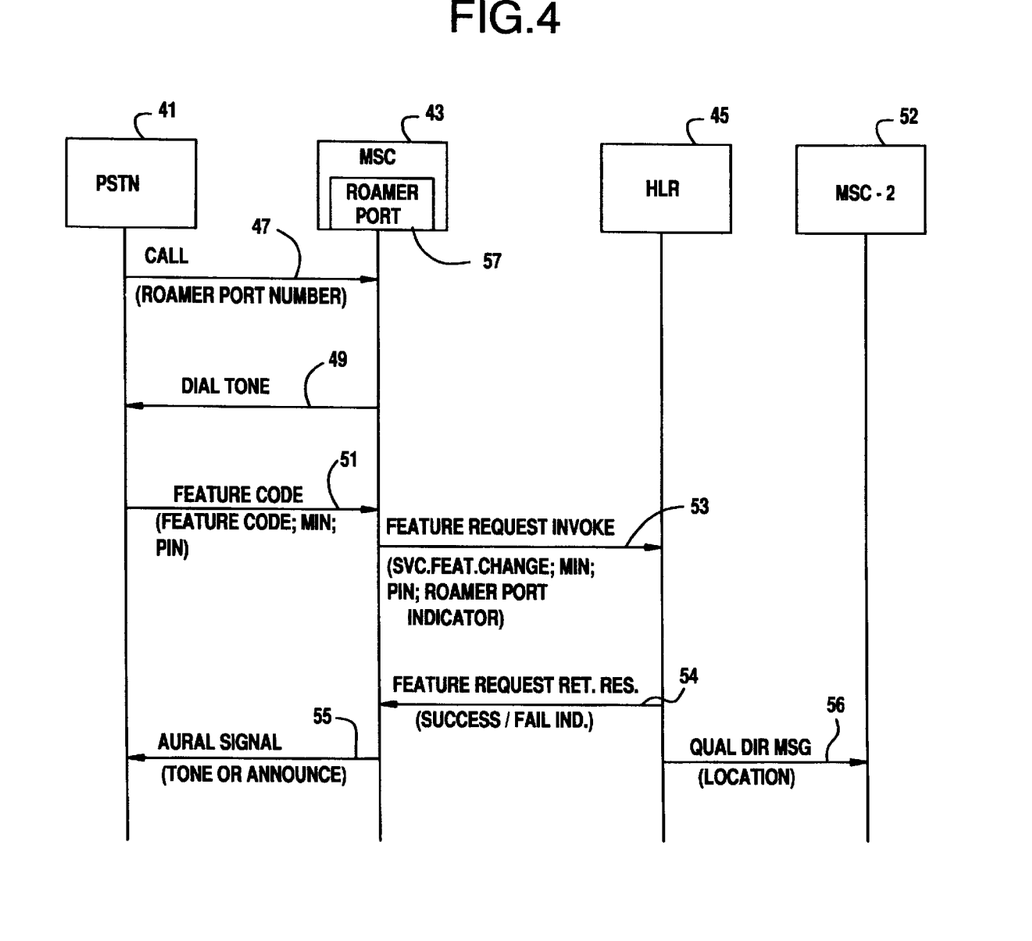
FIG. 4 is a signaling diagram illustrating the flow of messages between the nodes of a radio telecommunication system providing access to a mobile subscriber's service features when the mobile subscriber is located either inside or outside the subscriber's home coverage area in accordance with the teachings of the present invention.

FIG. 4 is a signaling diagram illustrating the flow of messages between the nodes of a radio telecommunication system providing access to a mobile subscriber's service features when the mobile subscriber is located either inside or outside the subscriber's home coverage area in accordance with the teachings of the present invention. Although the PSTN is illustrated, this is exemplary only. Any telephone or other source capable of calling the roamer port 57 is suitable and within the scope of the present invention. A mobile subscriber sends a call 47 to a MSC 43 from the PSTN 41 by dialing a roamer port number to access the MSC 43. The roamer port 57 located within the MSC 43 is the access point for communicating with the MSC 43. The MSC 43 responds by sending a dial tone 49 to the PSTN 41 indicating that the MSC 43 is ready for requests.

The subscriber, through the PSTN 41 sends a feature code message 51 including the feature code of the desired service feature change and the subscriber's MIN, to the MSC 43. The feature code 51 must begin with a feature code pretax and end with a feature code suffix. An example of a feature code indicator is "#". Following the feature code suffix, the MIN must be entered in order to identify the specific subscriber with the requested service feature. The feature code message 51 may also include an access code such as a PIN number for added security in preventing unauthorized service feature requests to the MSC 43. The MSC 43 is modified to recognize the feature code and verify that the feature code is a valid feature code. Additionally, the MSC 43 associates a service feature change with the valid feature code and associates the MIN with the HLR 45.

The MSC 43 then sends a feature request invoke message 53 requesting implementation of the desired service feature to the HLR 45. The feature request invoke message 53 includes the requested feature service change, the subscriber's MIN, and a roamer port indicator showing that the feature request was initiated at the roamer port 57. The feature request invoke message 53 may also include the subscriber's PIN. If a subscriber's PIN is used, the HLR 45 validates the subscriber's PIN. Next, the HLR 45 responds by performing the requested service feature change and sending a feature request return result message 54 to the MSC 43. The feature request return result message 54 includes an indicator showing success or failure of the requested change. Subsequently, the MSC 43 sends an aural signal 55 to the PSTN 41. If the requested service feature is successfully completed in the HLR 45, the MSC 43 may send a tone or announcement through the aural signal 55 indicating successful completion of the requested service feature.

The HLR 45 then determines whether a roamer port indicator is present in the feature request message. If a roamer port indicator is not present, the HLR takes no further action. However, if a roamer port indicator is present, the HLR takes steps to update the categories of the mobile subscriber, if required. First, the HLR determines whether the subscriber is active. Specifically, the HLR determines whether the subscriber's mobile phone is currently operating and registered in the MSC 43 (where the service feature request message originated). If the subscriber is not active, the HLR 45 takes no further action. If, however, the subscriber is active, the HLR determines whether the subscriber's location stored in the HLR is the same or different from the location where the feature request message originated. Specifically, the HLR 45 determines whether the subscriber's stored location is in the coverage area of MSC 43, or in the coverage area of another MSC, such as MSC-2 52. If the subscribers stored location is in the coverage area of MSC 43 (i.e., the same location where the feature request message originated), the HLR takes no further action. However, if the stored location is not in the coverage area of MSC 43 (for example, in MSC-2), the HLR 45 sends a Qualification Directive (QualDir) message 56 to the MSC-2 52. The QualDir message 56 updates the subscriber's categories in the MSC-2.

If the requested service feature is not successfully completed in the HLR 45, the MSC 43 may send, for example, a busy signal or negative announcement through the aural signal 55 indicating to the subscriber that the requested service feature change was unsuccessful.

Figure 5A:
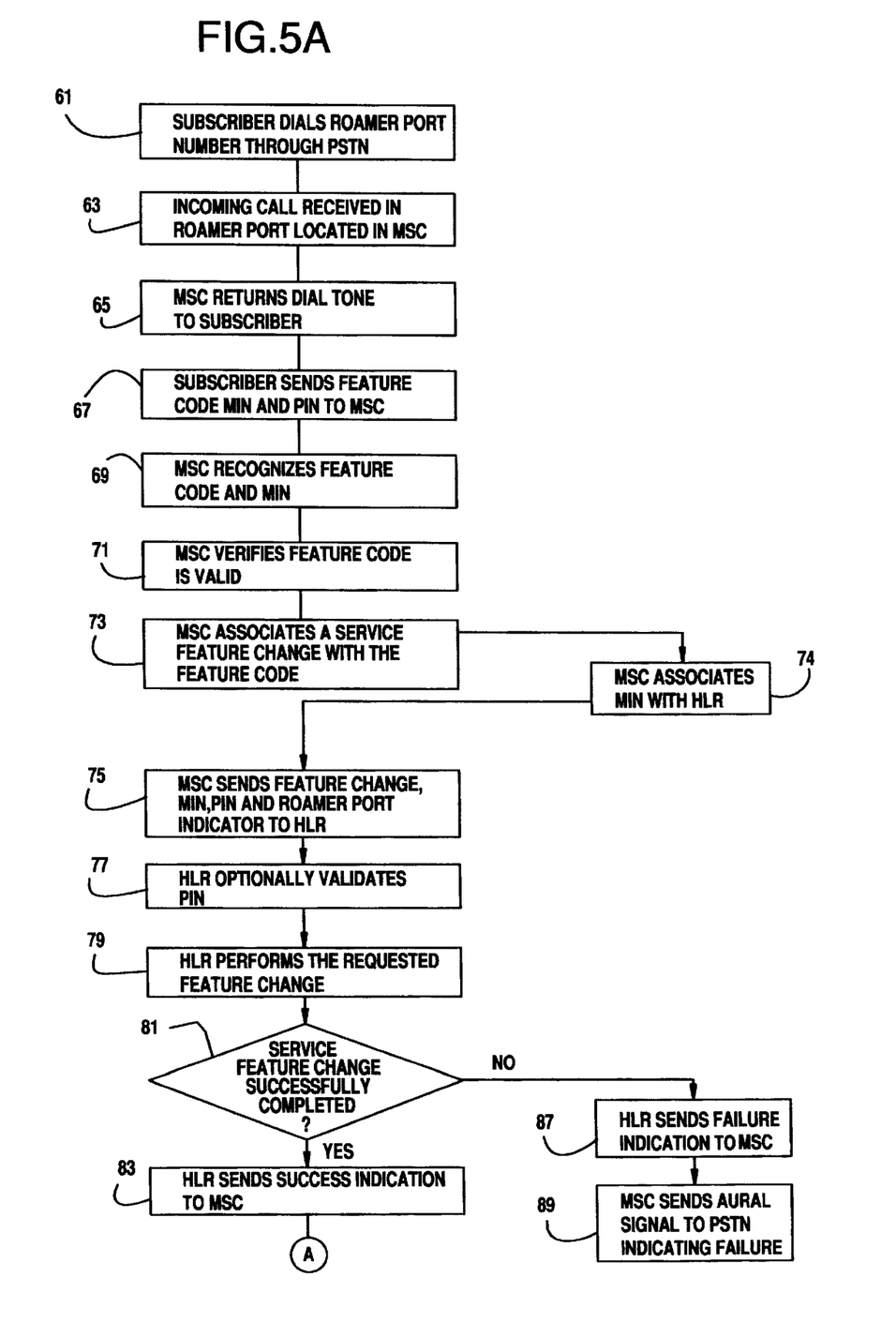
FIGS. 5A and 5B are a flow chart illustrating the steps of a method of enabling a mobile subscriber to access and change his service features through a roamer port according to the teachings of the present invention.
Figure 5B:
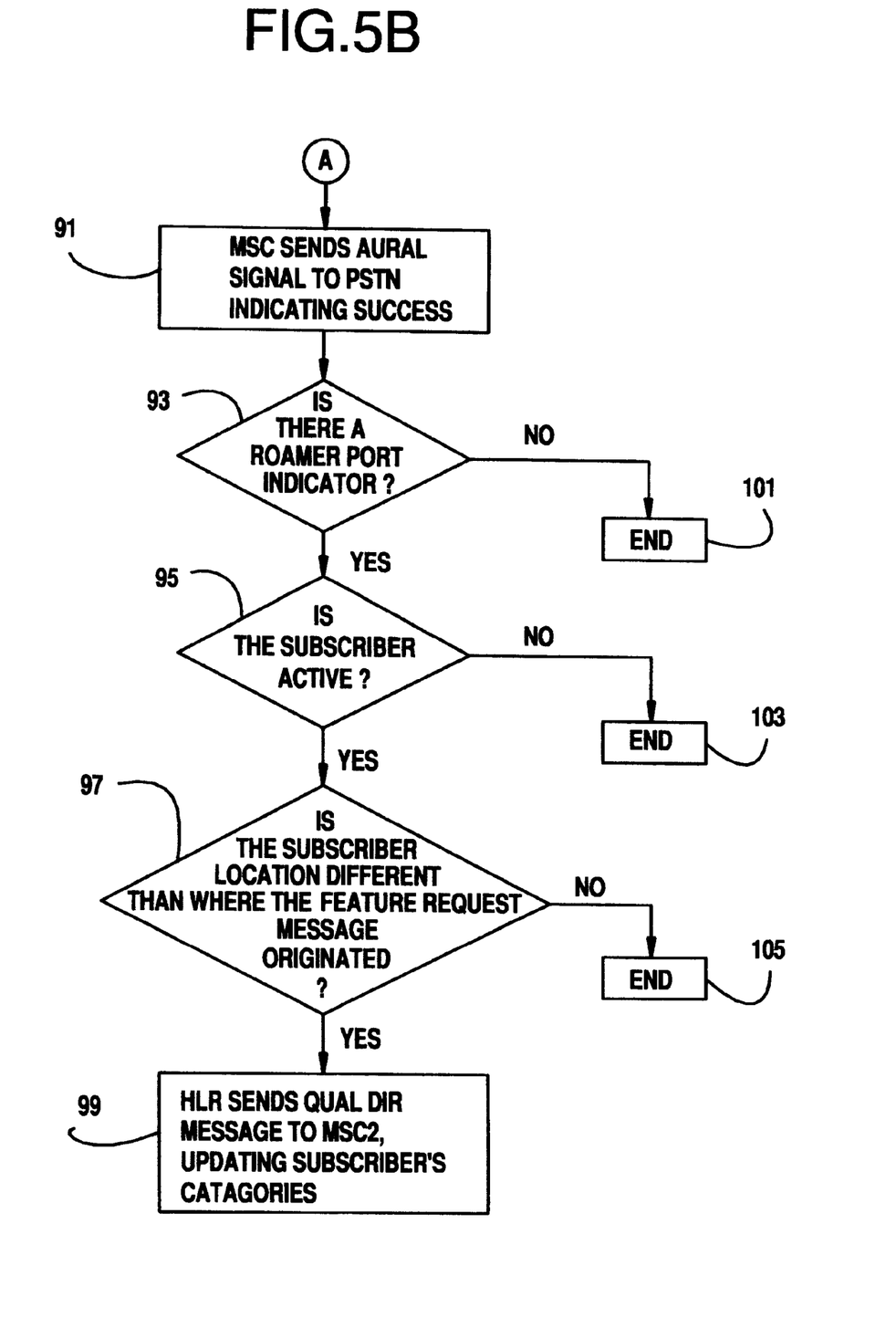

FIGS. 5A and 5B are a flow chart illustrating the steps of a method of enabling a mobile subscriber to access and change his service features through a roamer port according to the teachings of the present invention. Although the PSTN is illustrated, this is exemplary only. Any source capable of calling the roamer port is suitable and within the scope of the present invention. With reference to FIGS. 3, 5A, and 5B, the steps of the method will now be described.

Beginning with step 61, a subscriber dials a roamer port number through the PSTN 23. Next, in step 63, the incoming call is received in the roamer port 37 located in the MSC 27. In step 65, the MSC 27 responds by sending a dial tone to the subscriber indicating readiness to receive a command or a telephone number. Next, in step 67, the subscriber sends a feature code indicating a command and the subscriber's MIN to the MSC 27. A feature code prefix must precede the service feature code to alert the MSC 27 that a feature code follows. Additionally, the feature code must end with a feature code suffix to alert the MSC 27 that the feature code has ended. An access code or PIN may also be required to prevent unauthorized service feature requests.

In step 69, the MSC 27 recognizes the message as a feature code. Then, in step 71, the MSC 27 verifies that the service feature code is a valid feature code. In step 73, the MSC 27 associates the feature code with a service feature change. One method of associating the feature code with a service feature change is for the MSC 27 to look up, in a feature code table contained in the MSC 27, the feature code and the associated service feature change. In step 74, the MSC 27 associates the MIN with the HLR 29. Subsequently, in step 75, the MSC 27 sends a feature request invoke message to the HLR 29 indicating the requested service feature change. In step 77, the HLR optionally validates the subscriber's PIN. In step 79, the HLR 29 performs the requested service feature change. Next, in step 81, the HLR 29 determines if the service feature change has been successfully completed.

If, at step 81 the HLR 29 determines that the requested service feature is not successfully completed, the method moves from step 81 to step 87 where the HLR 29 sends a feature request return result message to the MSC 27 and includes a failure indication indicating that the requested service feature has not been successfully completed. In step 89, the MSC 27 sends an aural signal to the subscriber through the PSTN 23, indicating that the requested service feature has not been successfully completed. The aural signal may take the form of a busy signal or negative announcement to the subscriber.

If, however, the requested service feature is successfully completed, the method moves from step 81 to step 83 where the HLR 29 sends a feature request return result message to the MSC 27 and includes a success indication indicating that the requested service feature has been successfully completed.

The method then moves to FIG. 5B, step 91, where the MSC 27 sends an aural signal to the subscriber through the PSTN 23, indicating that the request service feature has been successfully completed. The aural signal may take the form of a tone or announcement.

Next, in step 93, the HLR 29 determines whether a roamer port indicator is present in the feature request message. If a roamer port indicator is not present, the method moves to step 101 where the HLR takes no further action. However, if a roamer port indicator is present, the method moves from step 93 to step 95 where the HLR determines whether the subscriber is active. Specifically, the HLR determines whether the subscribers mobile phone is currently operating and registered in the MSC 27 (where the service feature request message originated). If the subscriber is not active, the method moves to step 103 where the HLR 29 takes no further action. If, however, the subscriber is active, the method moves from step 95 to step 97 where the HLR determines whether the subscriber's location stored in the HLR is the same or different from the location where the feature request message originated. Specifically, the HLR 29 determines whether the subscriber's stored location is in the coverage area of MSC 27, or in the coverage area of another MSC, such as MSC-2 38. If the subscriber's stored location is in the coverage area of MSC 27 (i.e., the same location where the feature request message originated), the method moves from step 97 to step 105 where the HLR takes no further action. However, if the stored location is not in the coverage area of MSC 27 (for example, in MSC-2), the method moves from step 97 to step 99 where the HLR 29 sends a Qualification Directive (QualDir) message to the MSC-2 through communications link 38. The QualDir message updates the subscriber's categories in the MSC-2 38 where the subscriber is currently registered.

It is thus believed that the operation and construction of the present invention will be apparent from the foregoing description. While the method and system shown and described have been characterized as being preferred, it will be readily apparent that various changes and modifications could be made therein without departing from the spirit and scope of the invention as defined in the following claims.

What is claimed is:

1. A method of changing a mobile subscriber's service features in a radio telecommunication system having a first Mobile Switching Center (MSC) and a Home Location Register (HLR) for storing said service features and a location for said mobile subscriber, said method comprising the steps of:

originating a call from a landline telephone to a roamer port located within said first MSC;

sending a dial tone from said first MSC to said telephone;

sending a feature code and a Mobile Identification Number (MIN) for said mobile subscriber from said telephone to said first MSC requesting a service feature change;

recognizing said feature code in said first MSC;

verifying said feature code as a valid feature code in said First MSC;

determining, in said first MSC, a service feature change corresponding to said feature code;

associating said MIN with said HLR;

sending a first message from said first MSC to said HLR requesting said service feature change, said first message including said service feature change, said MIN, and a roamer port indicator; and implementing said service feature change in said HLR.

2. The method of claim 1 further comprising, after the step of implementing said service feature change, the steps of:

sending a second message from said HLR to said first MSC indicating the result of said service feature change request; and sending an aural signal from said first MSC to said telephone, upon successful implementation of said service feature change.

3. The method of claim 2 wherein said step of sending an aural signal includes sending a tone indicating successful completion of said service feature change.

4. The method of claim 2 wherein said step of sending an aural signal includes sending an announcement informing said subscriber of successful completion of said service feature change.

5. The method of claim 1 wherein said step of originating a call from a landline telephone includes originating a call from a standard wireline telephone in the Public Switched Telephone Network (PSTN).

6. The method of claim 1 wherein said step of originating a call from a landline telephone includes originating a call from a mobile station (MS), said call being transferred through the Public Switched Telephone Network (PSTN) to said first MSC.

7. The method of claim 1 wherein said step of sending a feature code includes sending a Personal Identification Number (PIN) with said feature code providing a security code to prevent unauthorized service feature change requests.

8. The method of claim 7 further comprising, after the step of sending a first message from said first MSC to said HLR requesting said service feature change, the step of validating said PIN by said HLR.

9. The method of claim 1 further comprising, after the step of implementing said service feature change in said HLR, the steps of:

determining, in said HLR, whether said roamer port indicator is present in said first message from said first MSC requesting said service feature change;

determining, in said HLR, whether said mobile subscriber is actively operating and registered in said first MSC, upon determining that said roamer port indicator is present;

determining, in said HLR, whether said mobile subscriber's location stored in said HLR is in the coverage area of a second MSC, upon determining that said mobile subscriber is active; and sending a third message from said HLR to said second MSC updating said mobile subscriber's categories in said second MSC, upon determining that the mobile subscriber's location stored in said HLR is in the coverage area of said second MSC.

10. The method of claim 1 wherein said step of determining a service feature change corresponding to said feature code includes determining said service feature change from a look-up table located in said first MSC.

11. The method of claim 1, further comprising, after the step of implementing said service feature change in said HLR, the steps of:

determining whether said service feature change has been successfully implemented by said HLR;

sending a return result message from said HLR to said first MSC indicating the result of said service feature change; and sending an aural signal from said first MSC to said telephone, upon said HLR determining that said service feature change was unsuccessfully implemented.

12. A method of changing a mobile subscriber's service features in a radio telecommunication system having a first Mobile Switching Center (MSC) and a Home Location Register (HLR) for storing said service features and a location for said mobile subscriber, said method comprising the steps of:

originating a call from a mobile telephone in said radio telecommunications system to a roamer port located within said first MSC;

sending a dial tone from said first MSC to said mobile telephone;

sending a feature code and Mobile Identification Number (MIN) entered by said subscriber from said mobile telephone to said first MSC requesting a service feature change;

recognizing said feature code in said first MSC;

verifying said feature code as a valid feature code in said first MSC;

determining a service feature change corresponding to said feature code in said first MSC;

associating said MIN with said HLR;

sending a feature request invoke message from said first MSC to said HLR, said feature request invoke message including said service feature change, said MIN, and a roamer port indicator; and implementing said service feature change in said HLR.

13. The method of claim 12 further comprising, after the step of implementing said service feature change, the steps of:

sending a feature request return result message from said HLR to said first MSC indicating the implementation of said service feature change; and sending an aural signal from said first MSC to said mobile telephone indicating the implementation of said service feature change to said mobile subscriber.

14. The method of claim 13 wherein said step of sending a feature code includes sending a Personal Identification Number (PIN) with said feature code providing a security code to prevent unauthorized service feature change requests.

15. The method of claim 14, further comprising, after the step of sending a feature request invoke message from said first MSC to said HLR, the step of validating said PIN by said HLR.

16. The method of claim 13 wherein said step of determining a service feature change corresponding to said feature code includes determining said service feature change from a look-up table located in said first MSC.

17. The method of claim 12, further comprising, after the step of implementing said service feature change in said HLR, the steps of:

determining whether said service feature change has been successfully implemented by said HLR;

sending a return result message from said HLR to said first MSC indicating the result of said service feature change; and sending an aural signal from said first MSC to said telephone, upon said HLR determining that said service feature change was unsuccessfully implemented.

18. The method of claim 12 further comprising, after the step of implementing said service feature change in said HLR, the steps of:

determining, in said HLR, whether said roamer port indicator is present in said feature request invoke message from said first MSC requesting said service feature change;

determining, in said HLR, whether said mobile subscriber is actively operating and registered in said first MSC, upon determining that said roamer port indicator is present;

determining, in said HLR, whether said mobile subscriber's location stored in said HLR is in the coverage area of a second MSC, upon determining that said mobile subscriber is active; and sending a third message from said HLR to said second MSC updating said mobile subscribers categories in said second MSC, upon determining that the mobile subscriber's location stored in said HLR is in the coverage area of said second MSC.

19. A radio telecommunication system for changing a mobile subscriber's service features from a telephone in a telecommunications network, said system comprising:

a home location register (HLR) for implementing changes to said service features of said subscriber;

a first mobile switching center (MSC) having a roamer port for receiving an incoming call from said telephone, said first MSC including means for recognizing a feature code in the incoming call and determining a corresponding request for a change in said service features;

means for sending said request for a change in said service features from said telephone to the roamer port in the first MSC, the change request including the feature code and a Mobile Identification Number (MIN) for the mobile subscriber; and means for sending said request for a change in said service features from said first MSC to said HLR.

20. The radio telecommunication system of claim 19 wherein said telecommunications network is the Public Switched Telephone Network (PSTN), and said telephone is a standard wireline telephone.

21. The radio telecommunication system of claim 19 wherein said telecommunications network is a radio telecommunications network, and said telephone is a mobile telephone.

22. The radio telecommunication system of claim 19 further comprising:

means for informing said first MSC whether said request for a change in said service features was implemented in said HLR; and means for informing said subscriber whether said request for a change in said service features was implemented.

23. The radio telecommunication system of claim 22 wherein said means for informing said subscriber whether said request for a change in said service features was implemented is an aural signal.

24. The radio telecommunication system of claim 23 wherein said aural signal is an announcement.

25. The radio telecommunication system of claim 22 wherein said means for informing said first MSC whether said request for a change in said service features was implemented in said HLR is a feature request return result message.

26. The radio telecommunication system of claim 19 wherein said means for sending a request for a change in a service feature from said telephone to said first MSC is a feature code message.

27. The radio telecommunication system of claim 26 wherein said means for sending said request for a change in said service feature from said first MSC to said HLR is a feature request invoke message.

28. The radio telecommunication system of claim 26 wherein said feature code message includes a Personal Identification Number (PIN) providing a security code to prevent unauthorized service feature change requests.

29. The radio telecommunication system of claim 19 further comprising:

a second MSC having a coverage area, said coverage area including the location of said mobile subscriber stored in said HLR;

means for updating categories of said mobile subscriber in said second MSC.

30. The radio telecommunication system of claim 29 wherein said means for updating said categories of said mobile subscriber in said second MSC is a Qualification Directive message sent from said HLR to said second MSC.

* * * * *

UNITED STATES PATENT AND TRADEMARK OFFICE
CERTIFICATE OF CORRECTION

PATENT NO. : 5,913,165
DATED : June 15, 1999
INVENTOR(S) : George Foti

It is certified that error appears in the above-indentified patent and that said Letters Patent is hereby corrected as shown below:

On the title page, item [54] and Column 1, line 2,

**In the title, change "METHOD" to --SYSTEM AND METHOD--; and
In the Assignee, change "ericsson" to "Ericsson".**

Column 1, line 1, change "METHOD" to --SYSTEM AND METHOD--;
Column 6, line 58, change "ink" to --link--; and
Column 7, line 66, change "pretax" to --prefix--.

Signed and Sealed this

Ninth Day of November, 1999

Attest:

Q. TODD DICKINSON

*Attesting Officer*    *Acting Commissioner of Patents and Trademarks*